Oct. 5, 1954 R. C. POTTS 2,690,867
DETACHABLE HANDLE-MEANS FOR PACKAGES
Filed Feb. 21, 1950 3 Sheets-Sheet 1
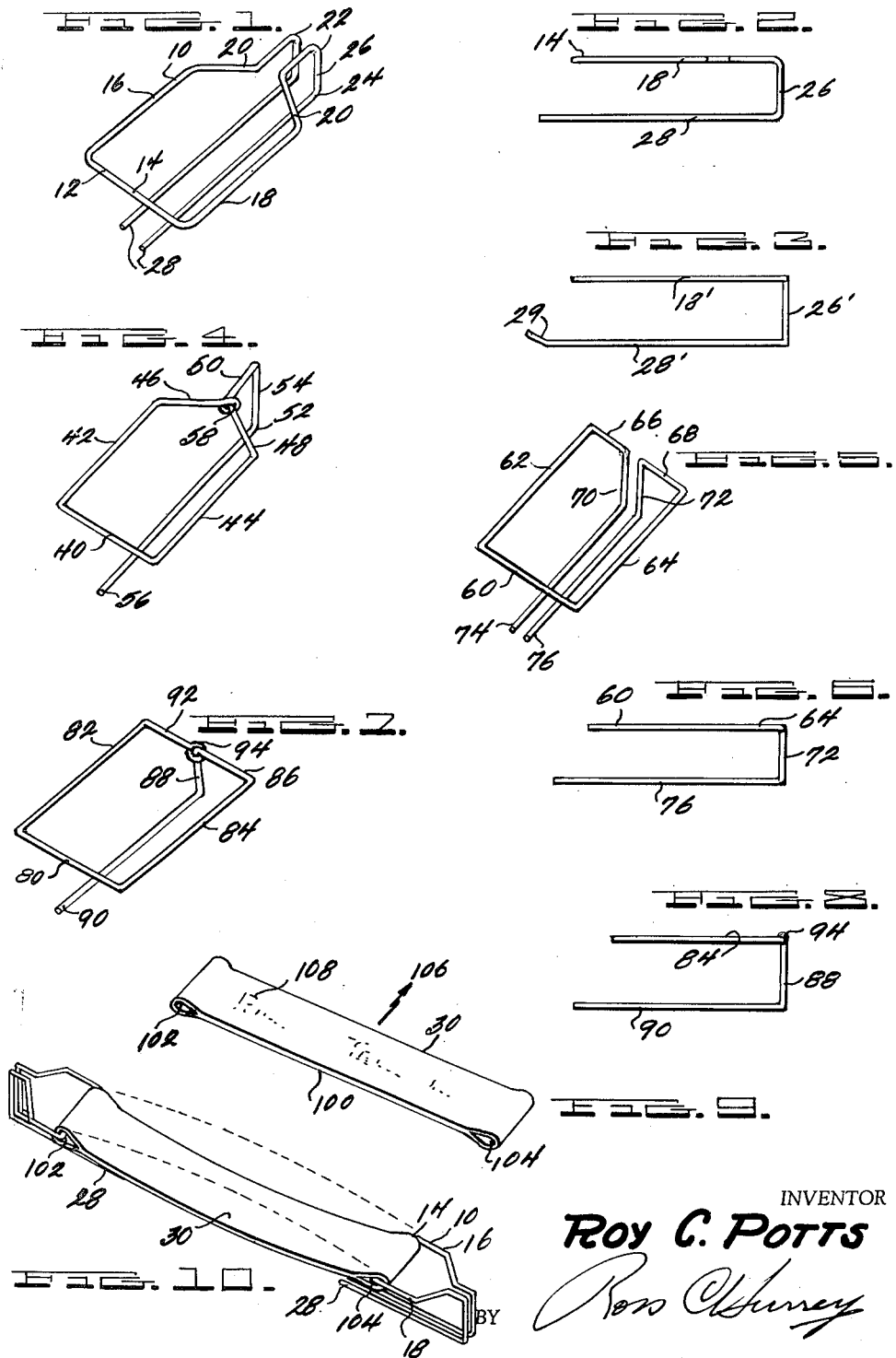
INVENTOR
Roy C. Potts
BY
ATTORNEY

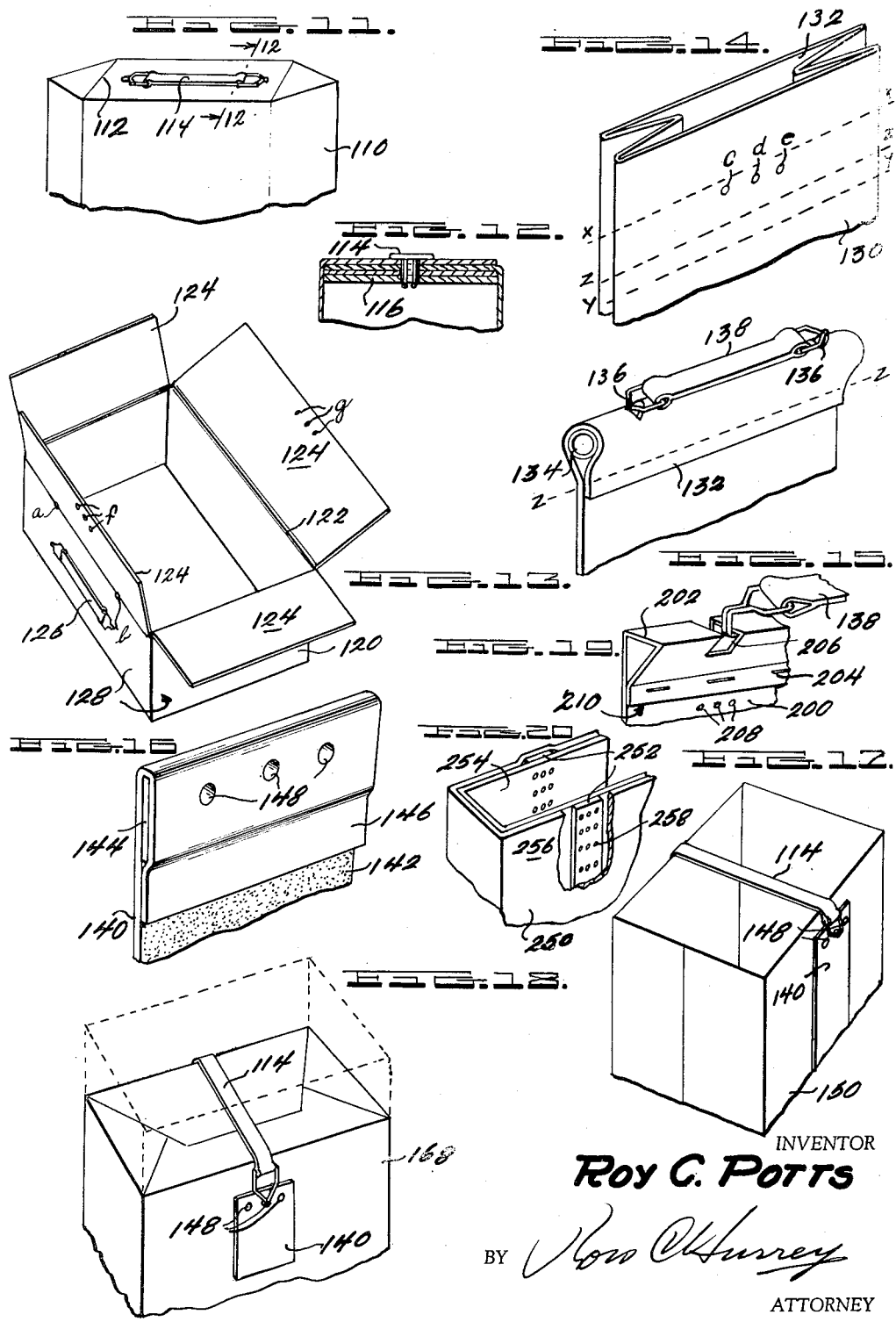

Oct. 5, 1954  R. C. POTTS  2,690,867
DETACHABLE HANDLE-MEANS FOR PACKAGES
Filed Feb. 21, 1950  3 Sheets-Sheet 3
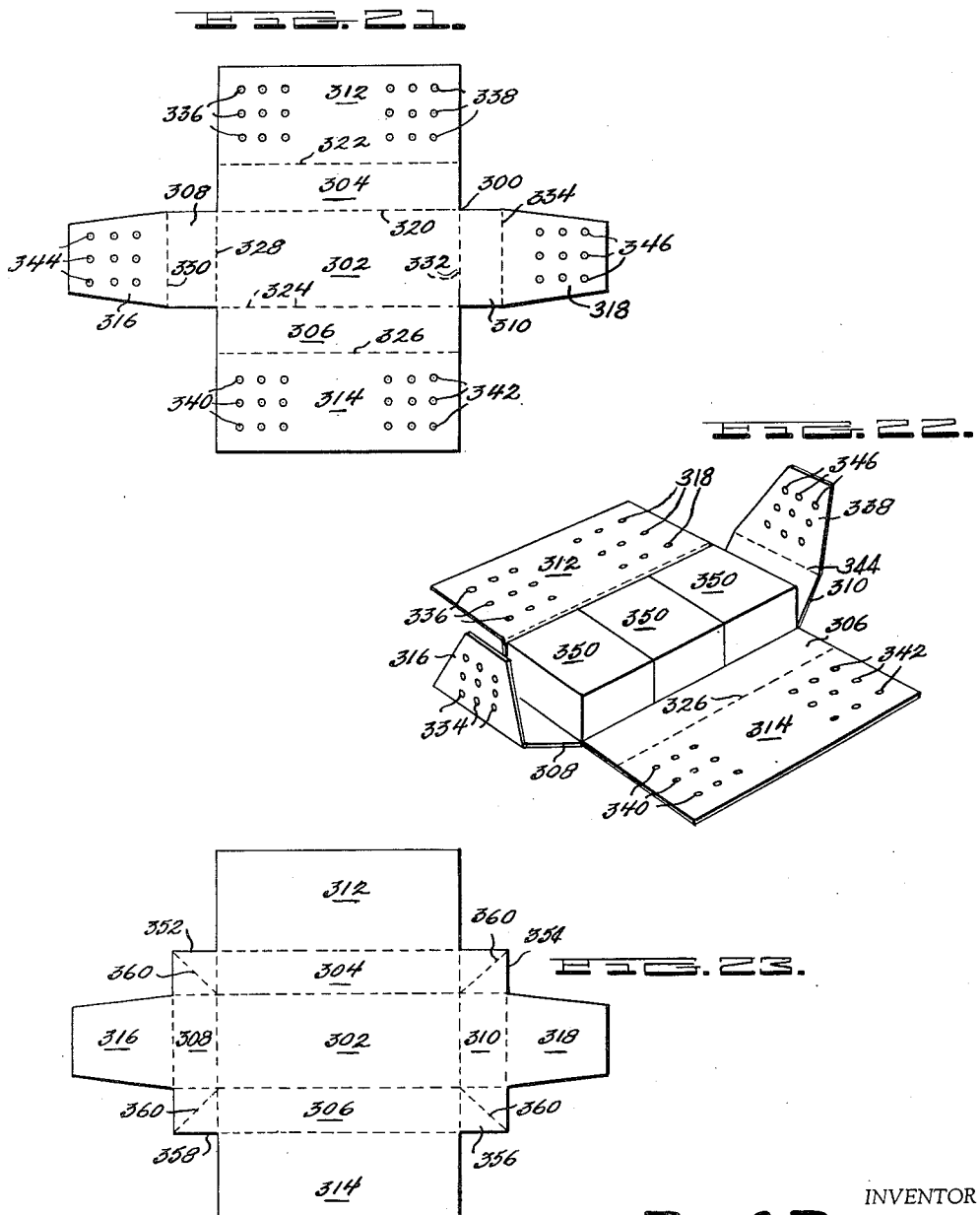
INVENTOR
*Roy C. Potts*
BY
ATTORNEY

Patented Oct. 5, 1954

2,690,867

UNITED STATES PATENT OFFICE 2,690,867

DETACHABLE HANDLE-MEANS FOR PACKAGES

Roy C. Potts, Washington, D. C.

Application February 21, 1950, Serial No. 145,442

20 Claims. (Cl. 229—52)

It is an object of this invention to provide a strap-handle-means which may be manually secured to various types of packages and containers and which may be easily removed therefrom and which is re-usable.

It is a further object of this invention to provide a handle means as aforesaid which is simple in construction and each part of which may be produced by automatic machinery at low cost and which parts may easily be assembled into the complete handle.

It is a further object of this invention to provide a handle means as aforesaid which may be manually attached to the wall of the container either by the container manufacturer, the container packer, the retailer, or the ultimate consumer, and which in all cases will serve as a practicable and convenient means for handling and carrying the container.

It is a further object of this invention to provide a handle means as aforesaid which in combination with a container of any desired type produces a practicable and convenient "ready to go" case or container that may be used for any desired purpose.

The above and other objects will be made clear from the following description, taken in connection with the annexed drawings, in which:

Figure 1 is a perspective view of a preferred form of fastener element which, while having individual utility, nevertheless is useful in the various combinations hereinafter set forth;

Figure 2 is a side elevation view of the element shown in Figure 1;

Figure 3 is a view similar to Figure 2 but illustrating a modification of that form;

Figure 4 is a perspective view similar to Figure 1 illustrating an element designed for lesser loads;

Figure 5 is a view similar to Figure 1 showing an alternative form of element;

Figure 6 is a side elevation of the element shown in Figure 5;

Figure 7 is a perspective view similar to Figure 5 showing still another form of element;

Figure 8 is a side elevation of the element illustrated in Figure 7;

Figure 9 is a perspective view illustrating one form of strap member for use in the combination hereinafter described;

Figure 10 is a perspective view showing the strap of Figure 9 assembled with elements of the form of Figures 1 and 2;

Figure 11 shows the combination of handle means applied to a satchel bottom bag;

Figure 12 is a section on the line 12—12 of Figure 11;

Figure 13 is a perspective view showing the application of the handle means to the side or end of a box;

Figure 14 is a perspective view showing the open mouth of a gusseted bag and illustrating the lines and areas of folding and securement for the attachment of the handle means;

Figure 15 is a perspective view showing the bag of Figure 14 folded and secured with the handle means in place;

Figure 16 is a perspective view showing an element for adapting my handle means to the top of an open bag such as a shopping bag;

Figure 17 is a perspective view of a shopping bag having a handle attached by means of the element illustrated in Figure 16;

Figure 18 is a perspective view illustrating the use of my handle means on a bag in which a sealed closure of the mouth underlies the handle;

Figure 19 is a perspective view illustrating a handle means attached to a fold line formed in the margin of a vertical package wall of unitary thickness;

Figure 20 is a perspective view illustrating the application of a reinforcing element to a multi-wall bag, the reinforcing element being secured between two of the several plies;

Figure 21 is a plan view of a blank from which a multiple package carrier adapted to the use of my improved handle assembly may be formed;

Figure 22 is a perspective view showing the manner of application of the blank of Figure 21 to a plurality of packages; and Figure 23 is a view similar to Figure 21 illustrating an alternative form of blank in which side, end and bottom walls are mutually integral.

In my Patent No. 2,463,306, dated March 1, 1949, I disclose a type of fastener adaptable to the dual purpose of securing together superimposed plies of a container wall and also acting as a base means for the securement of a handle. In that patent the inventive concept was focused more on the function of securing superimposed plies of a container against separation and only incidentally upon the use of such securing means as the base for a handle structure. The present invention is concerned only incidentally or collaterally with the provision of means for securing superimposed plies and is primarily directed to the provision of anchorage points for a handle structure with emphasis upon minimum cost, maximum strength from a handle standpoint and the greatest ease of securing and detaching the handle assembly to a variety of container types.

Referring now to Figure 1, I show a handle anchor means 10 comprising a looped or U-shaped member 12 made up of a base member 14 and opposite side members 16 and 18. The members 14, 16 and 18 lie in a single plane and are joined by means 20 to members 22 which constitute one leg of a second U-shaped member 24, said means 20 being deflected toward each other and substantially closing the fourth side of said loop. The member 24 has a base member 26 which connects the short leg 22 to a longer leg 28. The segments 22 and 26 together serve as a means connecting segments 20 to the leg member 28. This leg 28 generally is parallel to the plane of members 14, 16 and 18 and extends slightly beyond the member 14 as best shown in Figure 2. This structure is formed of a single length of wire and the members 22 may be parted to receive a handle member 30 as shown in Figure 9 and as hereinafter more fully described.

Figure 3 shows an alternative form in which 18' corresponds to the member 18, 26' corresponds to the member 26 of Figure 1, and 29 represents the end portion of the member 28' bent upwardly toward the plane of the member 18' to increase the resiliency of the grip attained between the U-shaped member represented by 18' and the longer leg represented by 28'.

In case it is not desired to utilize double strands of wire for the members 20, 22 and 24 of Figure 1, resort may be had to the construction illustrated in Figure 4. Here the upper loop is composed of a base member 40 and side members 42 and 44 which are joined by inclined members 46 and 48 to a straight member 50 comprising one leg of a U-shaped member 52. The base of the U-shaped member 52 comprises a member 54 normal to the plane of the U-shaped member defined by members 40, 42 and 44. This in turn is joined to a long leg 56 extending parallel to the first-mentioned U-shaped member and projecting somewhat beyond that member in the manner of member 28 in Figure 2. The free end 58 of the inclined member 46 is bent to form a hook which engages the inclined member 48. These members may be separated for the insertion of the strap 30 (Figure 9) by pressing the members 42 and 44 together.

When it is desired to dispense with inclined members such as 20 in Figure 1 or 46 and 48 as in Figure 4, resort may be had to the form illustrated in Figures 5 and 6. Here a U-shaped member is defined by a base member 60 and side members 62 and 64. The extremities of the side members 62 and 64 are joined by inwardly extending members 66 and 68 which are generally parallel to the base member 60. These are joined to vertical members 70 and 72 which are normal to the plane of the U-shaped member defined by members 60, 62 and 64. The members 70 and 72, respectively, are joined to members 74 and 76 which define the long leg of an L-shaped member in which the shorter leg is made up of vertical members 70 and 72. This longer leg projects beyond the member 60 by a reasonable distance as indicated in Figure 6.

When it is desired to produce substantially the form illustrated in Figures 5 and 6 without the use of double thicknesses of wire in the legs, resort may be had to the forms of Figures 7 and 8. Here the U-shaped member is made up of a base 80 and side members 82 and 84. The side member 84 terminates in an end member 86 generally parallel to the base 80. The extremity of the member 86 is turned downward to form a vertical member 88 normal to the plane of the U-shaped member. The vertical member 88 is joined to a leg 90 parallel to the plane defined by members 80, 82 and 84. The extremity of the side member 82 is joined to an end member 92, also generally parallel to the base member 80. The free end of the member 92 is formed into a hook 94 which engages at the intersection of members 86 and 88 to close the loop.

The strap member 30 previously referred to and illustrated in Figure 9 is a unitary integral structure of extruded plastic, preferably polyethylene or some similar elastomer. It comprises a body portion 100 having a loop 102 at one end and a loop 104 at the other end. The strap is continuously formed by extrusion in the direction of the arrow 106 and individual straps are severed from the continuously extruded strip. If desired, printed indicia 108 may be applied to the strip so that one or more lines of such indicia will appear on each strap, on one or both sides of it.

The handle assembly of this invention is illustrated in Figure 10 and may be formed from a strap of the type shown in Figure 9 combined with two of any of the forms of fastener or anchor elements disclosed in Figures 1 through 8. In Figure 10 the form of Figures 1 and 2 is illustrated. Here the strap 30 has one loop 104 passed about the anchor member 14 and between the side members 16 and 18 of a fastener 10 of the type shown in Figure 1. A similar fastener is similarly placed in the opposite loop 102 of the strap 30. In use, each fastener 10 has its leg 28 inserted through an aperture in a wall or in an auxiliary element of the package to be carried so that the leg 28 lies under the wall or through the auxiliary element and the U-shaped member lies parallel to and on the outer surface of the container wall or auxiliary element. Due to the parallelism of side members 16 and 18 the loops 102 and 104 of the strap 30 are freely slidable toward and from the base member 14 of the U-shaped member. This permits the handle to be flattened substantially into the plane of the container wall for purposes of shipment and storage but also permits the handle to be raised to the dotted line position illustrated in Figure 10 to provide a convenient carrying grip. This general relationship is shown in my Patent No. 2,463,306. When it is necessary or desirable that the handle means be pressed flat against the wall of the container, it is important that the sides of the loop in the strap and the sides of the loop in the fastener be parallel to permit free slidability. Where, however, such a feature is not needed, the loop of the fastener may be given any desired form. Preferably, however, such loops should extend from the vertical leg entirely in the direction of the lower parallel leg.

The handle structure just described is applicable to a variety of containers. Figures 11 and 12 illustrate the application of the handle to the bottom of a satchel bottom bag. Such a construction permits the bag to be filled through the usual open mouth which then may be given any of a variety of forms of conventional closures. In Figure 11 the bag is indicated generally as 110 and the conventional satchel bottom as 112. A handle assembly 114 similar to that illustrated in Figure 10 is applied. A piece of board or other stiff material 116 (Figure 12)

is placed in the interior of the satchel bottom 112. Both the bag bottom and the board have a pair of perforations for receiving legs such as 28 (Figure 1) of the fastener making up the handle assembly 114. This provides ample support for the pull occasioned by the weight of the contents on the handle.

In Figure 13, I show a regular slotted carton 120 having an open mouth 122 surrounded by conventional closure flaps 124. The box is loaded in the conventional manner and a handle member 126 is secured in one side or end wall 128. After closing and securing the flaps 124 upon the contents there results a convenient carrying package. It will be clear from a consideration of Figure 13 that it is feasible, if desired, to secure the handle structure in perforations formed in a fold line between two walls as, for example, at points $a$ and $b$ in Figure 13. Depending on the nature of the contents, such location may be more desirable as producing less interference between the legs of the fastener elements and the contents of the package than would be the case with the handle means secured in the side or end wall position shown in this figure. Of course it is also possible to supply perforations F and G in opposed closure flaps, locating these to be in alignment when the flaps are folded over the package. Here a handle assembly of the type shown in Figure 10 may be applied through the center perforations or, if desired, a two-legged fastener element connected with a handle strap of the type shown in my Patent No. 2,463,306 may be inserted through the outer perforations.

In Figure 14, I show a gusseted bag 130 which may be formed of any number and combination of plies, depending on the nature and weight of the contents. The bottom of the bag is closed by any conventional means. The open mouth 132, after the bag is filled, is collapsed and folded along line $x$—$x$ to bring the free edge of the mouth to line $y$—$y$. The folded end is then secured to the bag by a line of stitching, stapling or adhesive as circumstances may warrant corresponding generally to line $z$—$z$. Where the weight of the contents is considerable it may be well to insert a plastic tube 134 along the fold line $x$—$x$. A handle member as shown in Figure 10 may in the case of a narrow bag be applied by insertion of the legs 28 or equivalent legs of the other forms through the ends of the tube 134. When the bag is wide, notches 136 may be cut into the bag and the tube for the reception of legs 28 of a handle member 138. When the weight of the contents is not too great the tube 134 may be dispensed with and reliance may be had purely on the strength of the material at the fold line $x$—$x$ in which case the fastener elements either are inserted at the ends of the folds or through notches as illustrated in Figure 15.

When the closure of the bag is effected as by sewing, stapling or other sealing, as on line $x$—$x$ of Figure 14, the handle means of Figure 10 may be attached to the wall of the bag through perforations such as $c$, $d$ or $e$ made below the line $x$—$x$ with the legs of each of the anchor elements 10 of Figure 10 inserted through one of the said perforations on opposite sides of the bag, the handle element of the strap 30 of Figure 10 itself forming a loop crosswise and over the top of the mouth of the bag. Obviously the handle means shown in my Patent No. 2,463,306 may be similarly secured and used as a handle for a bag by inserting its legs through perforations $c$ and $e$.

In Figure 16, I show a strip of tape 140 having a gummed or other adhesive surface 142. One end of the tape is folded around and adhered to a reinforcing strip of fiber board 144 and the free end 146 of the tape is moistened and secured against the facing gummed surface. One or more perforations 148 are formed through the folded tape and the reinforcing element on either outside or inside wall of the bag.

In use, a pair of members of the type shown in Figure 16 are adhesively attached to opposite sides of a bag 150 as shown in Figure 17. If desired, a single member may be used with a reinforcing sheet or piece of board such as 144 folded into each end. In this case the single piece passes entirely around the bottom of the bag. In either case a handle unit such as 114 is secured by engagement with one or more of the perforations 148.

Many carriers for bottles and cans are formed with a central or other partition walls comprising usually a single thickness of board and in which hand or finger holds are die-cut. In any such situation my improved handle structure may be applied as illustrated in Figure 19 in which the central partition wall or similar member is designated 200 and is shown as folded at 202 and secured at 204 much in the manner of the bag top illustrated in Figures 14 and 15. Once such a fold is formed a handle member 138 may be applied through perforations 206 as shown, or, if the partition be narrow, the fastener elements of the handle 138 may be inserted in the opening formed at the ends of the fold line, also they may be attached as in Figure 14 by inserting the legs through the perforations 208 in the partition wall 200 below the line 210, which may be the top edge of the said wall.

In cases where for any reason the presence of reinforcing elements such as 140 (Figures 17 and 18) on the exterior would be objectionable, such elements may be placed either on the interior or, in the case of a multi-ply structure, between any two plies. This latter construction is illustrated in Figure 20 in which a bag 250 has reinforcing elements 252 inserted between an inner ply 254 and another ply 256. The reinforcing elements 252 optionally may be secured to either or both of the plies and perforations 258 are formed in spaced sets of threes to provide adjustability of the level at which it is desired to secure the handle. The provision of the perforations in sets of threes provides the option either of using the improved single leg fastener elements disclosed herein or the double legged fastener elements described in my Patent No. 2,463,306.

For the sake of convenience and economy of manufacture I prefer to feed the reinforcing elements between the requisite plies during the course of forming the tube from which the bag lengths are severed. This means that no assembly step involving the separation of adjacent plies is required. The reinforcing elements are present and extend the full length of the bag and necessarily enter into the bottom closure regardless of the form which such closure may take. The perforations then are all made through both sides of the bag and the reinforcing elements in one punch-press operation effected after or during the bag-making operation.

Many so-called shopping bags presently are manufactured with a reinforced mouth. In bags of this class tape elements such as 140 need not be used and the perforations may be formed directly in the reinforced area of the bag mouth or in the extension of that area downwardly on opposite sides of the bag, in which case the reinforcing element may be applied either to the inside or the outside wall of the bag or to the adjacent surfaces of the ply walls in a multi-wall bag.

Frequently it would be very convenient to be able to take two, three or more unitary packages, for example, 1-quart baskets of berries, and secure these together with a single handle means for carrying purposes. Figures 21–23 illustrate means of accomplishing this end.

In Figure 21 there is shown a blank 300 formed from a single piece of board and having a bottom panel 302, side panels 304 and 306 and end panels 308 and 310. A cover panel 312 forms an integral extension of the side panel 304 while a similar cover panel 314 forms an integral extension of the side panel 306. A top closure panel 316 forms an integral extension of end panel 308 and a similar top closure panel 318 forms an integral extension of the end panel 310.

A score line 320 separates the bottom panel 302 from the side panel 304 while a score line 322 separates the side panel 304 from its top closure panel 312. Similarly a score line 324 separates bottom panel 302 from side panel 306 while a score line 326 separates side panel 306 from its top closure panel 314. A score line 328 separates bottom panel 302 from end wall 308 while a score line 330 separates end panel 308 from its top closure panel 316. In the same manner a score line 332 separates bottom panel 302 from end panel 310 while a score line 334 separates end panel 310 from its top closure flap 318.

Top closure flap 312 has successive lines of perforations 336 adjacent one end and similar lines of perforations 338 adjacent its other end. Each line comprises three lines of perforations so that officially these may be engaged either with fastener elements of the handle assembly as disclosed herein or with elements of the handle assembly as shown in my Patent No. 2,463,306.

Top closure flap 314 has identical groups of perforations 340 at one end and 342 at the other end. These are located so that when the blank 300 is folded about a plurality of packages the perforations of group 336 on panel 312 are in registry with the perforations of group 340 in panel 314. Similarly the perforations of group 338 on flap 312 will register with the perforations of group 342 of closure flap 314.

Top closure flap 316 attached to end panel 308 has a group of perforations 344 identical with each of the groups of perforations occurring in top panels 312 and 314 while top closure flap 318 attached to end panel 310 has a group of perforations 346 identical with those occurring in top closure flaps 312 and 314.

In use a plurality of packages 350 are assembled on the bottom panel 302 and side panels 304 and 306 are folded up against the sides of the assembled packages. End panels 308 and 310 then are folded against the ends of the outermost packages. Top closure flaps 316 and 318 then are folded to overlie at least the outermost packages of the assembly and the side panel top closure flaps 312 and 314 then are mutually superimposed upon each other and upon the flaps 316 and 318. This brings in one end of the package perforations groups 336, 340 and 344 into mutual registry and at the opposite end perforations groups 338, 342 and 346 into mutual registry, ready for engagement with the fastener elements either in the handle assembly as disclosed herein or the fastener elements of the handle assembly shown in my Patent No. 2,463,306.

There being in each group multiple rows of perforations, the package is adaptable to various lengths of handles by engagement with one or other rows of perforations in each group.

In Figure 23 I show a blank altogether identical with that disclosed in Figure 21 except for the provision of a panel 352 lying between end panel 308 and side panel 304. A similar panel 354 is provided between side panel 304 and end panel 310. A similar panel 356 is provided between end panel 310 and side panel 306 while still another panel 358 lies between side panel 306 and end panel 308. Each of the panels 352, 354, 356 and 358 is provided with a diagonal score line 360. It will be understood, of course, that closure flap panels 312, 314, 316 and 318 will be provided with groups of perforations similar to those illustrated in Figure 21.

When the blank of Figure 23 is erected in the manner illustrated in Figure 22 each of the panels 352, 354, 356 and 358 is folded inwardly along its score line 360 to provide an interior triangular ear at each corner. The ear may be folded optionally against either the adjacent side panel or the adjacent end panel. The effect of providing these panels 352—358 is to set up an integral leak-proof body structure which may be important when such items as fruits are to be handled where there may be leakage of juice.

While I have disclosed herein various specific embodiments of my inventive concept, I do not intend to be limited to the physical details illustrated and described, but only as set forth in the sub-joined claims which are to be broadly construed.

I claim:

1. A fully preformed unitary fastener element for attaching a handle-means to a container, said fastener element comprising a loop member lying in a plane and having two opposite side portions of the loop of similar configuration, a third or base side of said loop which is a straight member and integral with each of the said two opposite sides, the fourth side of said loop being substantially closed by extended segments of each of said opposite side portions which are deflected toward each other, a leg member spaced from and substantially parallel to said loop member, and means connecting the extended segments of the two opposite side portions of said loop member with the said leg member, the free end of said leg member extending in the direction of and beyond the said third side of said loop in a plane substantially parallel to the plane of said loop member and in a vertical plane which practically bisects said third side of said loop.

2. A fully preformed unitary fastener element as defined in claim 1 in which the extreme end portion of the said leg member is deflected toward the plane of said loop member.

3. A fully preformed unitary fastener element as defined in claim 1 in which the leg member is comprised of two juxtaposed strands of wire.

4. A complete handle-means assembly comprising a pair of fully preformed fastener elements and a strap member having a loop in each end of it, each of said fastener elements comprising a loop member lying in a plane and having two opposite side portions of the loop of similar configuration, a third base side of said loop being a straight segment integral with each of the said two opposite sides, the fourth side of said loop being substantially closed by extended segments of each of said opposite side portions which are deflected toward each other, a leg member comprised of two juxtaposed strands of wire spaced from and substantially parallel to said loop member, and means connecting the extended segments of the two opposite side portions of said loop member with the said leg member, the free end of said leg member extending in the direction of and beyond the said third side of said loop in a plane substantially parallel to the plane of said loop member and in a vertical plane which practically bisects said third side of said loop, each end-loop of the strap member being engaged to a loop member of a fastener element and the legs of the pair of fastener elements being directed toward each other and lying on the same side of the strap member.

5. In combination, a package having a wall containing a pair of spaced perforations, a handle assembly of the type set forth in claim 4, the leg of each of the fastener elements of said assembly being passed through one of said perforations to engage the wall of said container between the legs and loops of the fastener elements.

6. In combination, a handle-means assembly of the character described in claim 4 and a reinforcing strip or element secured to the outer surface of a container, said reinforcing strip having at least one row of perforations extending lengthwise of said strip and adapted to receive through at least one pair of said perforations the legs of the fastener elements of said handle-means assembly.

7. In combination, a handle-means assembly of the character described in claim 4 and a reinforcing strip secured around a container, said reinforcing strip bearing at least one row of spaced perforations extending lengthwise of said strip and adapted to receive through a pair of said spaced perforations the legs of the fastener elements of said handle-means, said legs when inserted lying on the inner surface of the said reinforcing strip.

8. In combination, a handle-means assembly of the character described in claim 4 and a container having two opposite upstanding walls and a reinforcing strip secured to each of said walls and having at least one perforation in each reinforcing strip, a leg of each of the fastener elements of said handle-means being inserted respectively through a perforation in each of said reinforcing strips.

9. A package or carrier having an upstanding wall, said wall having at least two spaced perforations therein, and a handle assembly of the type set forth in claim 4, the legs of the fastener elements of said handle assembly being respectively engaged each with one of said perforations but entering from opposite sides of said wall.

10. In combination, a package or container having an upstanding wall, said wall being folded over and secured to itself to form a loop, said loop being perforated at spaced points, and, a handle-means assembly as set forth in claim 4, the legs of the fastener elements of said handle-means being engaged through said spaced perforations.

11. The combination set forth in claim 10 in which the said loop is reinforced by a tube inserted within it and having notches therein at spaced points coordinate with the spaced perforations in the loop, the legs of the fastener elements of said handle-means being engaged through both the spaced perforations in the loop and the spaced notches in the tube.

12. In combination, a complete handle-means assembly comprising a pair of fully preformed fastener elements and a strap member having a loop in each end of it, each of said fastener elements comprising a loop member lying in a plane and having two opposite side portions of the loop of similar configuration, a third base-side of said loop being a straight segment integral with each of the said two opposite sides, the fourth side of said loop being substantially closed by extended segments of each of said opposite side portions which are deflected toward each other, a leg member comprised of two juxtaposed strands of wire spaced from and substantially parallel to said loop member, and means connecting the extended segments of the two opposite side portions of said loop member with the said leg member, the free end of said leg member extending in the direction of and beyond the said third side of said loop in a plane substantially parallel to the plane of said loop member and in a vertical plane which practically bisects said third side of said loop, each end-loop of the strap member being engaged to a loop member of a fastener element and the legs of the pair of fastener elements being directed toward each other and lying on the same side of the strap member; and, a container comprising material within at least one of its parts, which is substantially resistant to tear and having at least one pair of spaced perforations in said tear resistant part, the legs of the fastener elements of said handle-means assembly being inserted through respective perforations in said tear resistant part of the container.

13. The combination set forth in claim 12 in which the container is a flat bottom or satchel type bag and one of its tear-resistant parts is the bottom thereof reinforced by a sheet of stiff material placed interiorly on the bottom of the bag.

14. The combination set forth in claim 12 in which the container is a multi-wall bag and its tear-resistant parts comprise two of the plies and a reinforcing element secured between said plies, said plies and reinforcing element being located in two opposite walls of the bag and having at least one perforation thru said plies and reinforcing element in each of said opposite walls, and having the legs of the fastener elements inserted through the respective perforations in said plies and reinforcing elements.

15. The combination set forth in claim 12 in which the container is a bag having two opposed walls and its tear-resistant parts comprise reinforcing elements adhesively secured to each of said walls and having at least one perforation in each reinforcing element, the legs of the fastener elements being inserted through respective perforations in the said reinforcing elements.

16. In combination, a complete handle-means assembly comprising a pair of fully preformed fastener elements and a strap member having a loop in each end of it, each of said fastener elements comprising a loop member lying in a plane and having two opposite side portions of the loop of similar configuration, a third base-side of said loop being a straight segment integral with each of said two opposite sides, the fourth side of said loop being substantially closed by extended segments of each of said opposite side portions which are deflected toward each other, a leg member comprised of two juxtaposed strands of wire spaced from and substantially parallel to said loop member, and means connecting the extended segments of the two opposite side portions of said loop member with the said leg member, the free end of said leg member extending in the direction of and beyond the said third side of said loop in a plane substantially parallel to the plane of said loop member and in a vertical plane which practically bisects said third side of said loop, each end-loop of the strap member being engaged to a loop member of a fastener element and the legs of the pair of fastener elements being directed toward each other and lying on the same side of the strap member; and, a container having two opposite walls and a reinforcing strip secured to each of said walls and having at least one perforation in each reinforcing strip, a leg of each of the fastener elements of said handle-means assembly being inserted through respective perforations in said reinforcing strips.

17. The combination set forth in claim 16 in which the said reinforcing strips are integral with each other and extend around the bottom of the container.

18. In combination, a complete handle-means assembly comprising a pair of fully preformed fastener elements and a strap member having a loop in each end of it, each of said fastener elements comprising a loop member lying in a plane and having two opposite side portions of the loop of similar configuration, a third base-side of said loop being a straight segment integral with each of said two opposite sides, the fourth side of said loop being substantially closed by extended segments of each of said opposite side portions which are deflected toward each other, a leg member comprised of two juxtaposed strands of wire spaced from and substantially parallel to said loop member, and means connecting the extended segments of the two opposite side portions of said loop member with the said leg member, the free end of said leg member extending in the direction of and beyond the said third side of said loop in a plane substantially parallel to the plane of said loop member and in a vertical plane which practically bisects said third side of said loop, each end-loop of the strap member being engaged to a loop member of a fastener element and the legs of the pair of fastener elements being directed toward each other and lying on the same side of the strap member; and, a container having a wall containing a pair of spaced perforations and the leg of each of the fastener elements of said handle-means assembly being inserted through respective perforations to engage the wall of the container between the legs and the loops of the fastener elements, said container being a bag having its mouth collapsed and folded over upon the body of the bag and the wall is the fold line of the folded mouth.

19. In combination, a complete handle-means assembly comprising a pair of fully preformed fastener elements and a strap member having a loop in each end of it, each of the said fastener elements comprising a loop member lying in a plane and having two opposite side portions of the loop of similar configuration, a third base-side of said loop being a straight segment integral with each of said two opposite sides, the fourth side of said loop being substantially closed by extended segments of each of said opposite side portions which are deflected toward each other, a leg member comprised of two juxtaposed strands of wire spaced from and substantially parallel to said loop member, and means connecting the extended segments of the two opposite side portions of said loop member with the said leg member, the free end of said leg member extending in the direction of and beyond the said third side of said loop in a plane substantially parallel to the plane of said loop member and in a vertical plane which practically bisects said third side of said loop, each end-loop of the strap member being engaged to a loop member of a fastener element and the legs of the pair of fastener elements being directed toward each other and lying on the same side of the strap member; and, a container having two opposite walls and a reinforcing strip secured to each of said walls, said reinforcing strip comprising a strip of flexible material having one end folded upon itself to provide a reinforcing area and having at least one perforation within the area of reinforcement and a leg of each of the fastener elements of said handle-means assembly being inserted through respective perforations in said reinforcing strips.

20. The combination set forth in claim 19 in which the said reinforced area is additionally reinforced by a supplemental reinforcing element such as a strip of fibreboard enclosed within the folded end of each reinforcing strip.

References Cited in the file of this patent

UNITED STATES PATENTS

| Number | Name | Date |
|---|---|---|
| 1,208,445 | Arnold | Dec. 12, 1916 |
| 1,604,801 | Boden et al. | Oct. 26, 1926 |
| 1,645,499 | Fenton | Oct. 11, 1927 |
| 1,958,587 | Mitchell et al. | May 15, 1934 |
| 2,277,739 | Worthington | Mar. 31, 1942 |
| 2,348,551 | La Place | May 9, 1944 |
| 2,374,645 | Borbe | May 1, 1945 |
| 2,442,385 | Then | June 1, 1948 |
| 2,463,306 | Potts | Mar. 1, 1949 |

FOREIGN PATENTS

| Number | Country | Date |
|---|---|---|
| 14,795 | Australia | Sept. 6, 1934 |